(12) United States Patent
Patino et al.

(10) Patent No.: US 6,980,912 B2
(45) Date of Patent: Dec. 27, 2005

(54) METHOD AND APPARATUS FOR USE WITH A PORTABLE POWER SOURCE

(75) Inventors: Joseph Patino, Pembroke Pines, FL (US); Randall S. Fraser, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 35 days.

(21) Appl. No.: 10/729,651

(22) Filed: Dec. 5, 2003

(65) Prior Publication Data

US 2005/0125172 A1   Jun. 9, 2005

(51) Int. Cl.[7] .......................... G06F 19/00; G01R 31/36
(52) U.S. Cl. .......................... 702/63; 702/64; 702/65
(58) Field of Search .............................. 702/63, 64, 65, 702/79, 81, 87, 88, 182, 183, 189, 193; 320/145, 320/156, 160, 161; 429/50, 93

(56) References Cited

U.S. PATENT DOCUMENTS

| | | | | |
|---|---|---|---|---|
| 4,193,026 A | * | 3/1980 | Finger et al. | 324/428 |
| 5,115,182 A | | 5/1992 | Ehmke et al. | |
| 5,284,719 A | * | 2/1994 | Landau et al. | 429/50 |
| 5,331,268 A | * | 7/1994 | Patino et al. | 320/158 |
| 5,751,217 A | | 5/1998 | Kchao et al. | |
| 6,337,560 B1 | | 1/2002 | Kalogeropoulos et al. | |

* cited by examiner

*Primary Examiner*—Bryan Bui

(57) ABSTRACT

An apparatus (10) having a portable power source (11) can make use of a plurality of differing charge depleted threshold values (and, in a preferred embodiment, corresponding visual charge-remaining indicators) to determine what level of charge remains in the portable power source (11). This in turn permits the recharging advice as suggested by the visual indicator to better track and reinforce the ordinary recharging behaviors of a given user. So configured, the total lifetime of the portable power source may be extended while also ensuring that the portable power source will be fully charged upon completion of each charging cycle.

20 Claims, 2 Drawing Sheets

METHOD AND APPARATUS FOR USE WITH A PORTABLE POWER SOURCE

TECHNICAL FIELD

This invention relates generally to portable power supplies and more particularly to charge depletion sensing and corresponding indicia.

BACKGROUND

Various devices rely in whole or in part on portable power supplies such as one or more batteries. In many cases such portable power supplies are rechargeable; that is, within some reasonable bounds of operational integrity a given portable power supply can be recharged to equal or nearly equal a previously level of charge.

One prior art approach uses a single recharging process to recharge a portable power supply regardless of how fully the portable power supply may have been discharged. For example, some recharging processes rely upon a so-called constant-current, constant-voltage two-phase methodology that utilizes identical operational parameters essentially regardless of how fully or partially the portable power supply might actually be discharged.

A significant relationship is known to exist, however, between depth of discharge for a portable power supply on the one hand and total life cycle on the other hand. Such a monolithic approach as is presented above essentially ignores this relationship and offers a single charging solution that usually fails to permit any dynamic adjustment that might offer improved life cycle performance.

One prior art approach seeks to redress this situation by using different charge voltages and/or different current cut-off values during battery recharging. For example, a battery can be repeatedly charged using a first charge voltage during a first time period and then repeatedly charged using a second charge voltage during a second time period. By establishing a difference between the first and second charge voltage, at least under some operating circumstances one can expect to utilize the second charge voltage to diminish the battery's capacity at a different (hopefully better) rate than when using the first charge voltage.

Such an approach, while offering possible advantages under some operating circumstances, nevertheless fails in other respects to meet the needs of certain users. For example, using this approach, the battery will often be only partially charged following the charging process. So long as the user does not require full capacity performance this accommodation may be acceptable. When, however, the user needs the full capacity of the battery for whatever reason, this approach poorly serves the user's needs.

BRIEF DESCRIPTION OF THE DRAWINGS

The above needs are at least partially met through provision of the method and apparatus for use with a portable power source described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a device having a portable power supply comprises a first charge depleted threshold value and a second charge depleted threshold value, wherein the latter represents a level of charge depletion for the portable power source that is less than a level of charge depletion as corresponds to the first charge depleted threshold value. Pursuant to one embodiment, both charge depleted threshold values can be predetermined and fixed. Pursuant to another embodiment, at least the second charge depleted threshold value can be determined or modified as a function, at least in part, of historical levels of charge depletion for the device. A selected charge depleted threshold value is then used to determine when to present information to a user of the device to indicate that the portable power source should be recharged.

So configured, a given user can be instructed to now recharge a given portable power supply notwithstanding that the given power supply in fact still retains charge in reserve. In particular, when it can be determined that a given user tends to usually recharge their power source when the power source has only been depleted to, for example, about 20% in reserve capacity, the second charge depleted threshold value can serve to indicate this level of capacity. In turn, this second charge depleted threshold value can serve to mark when the user should be informed to now recharge the power source. This permits the advantages of prior art charging strategies to be employed while also usually ensuring that the battery, once charged, will be essentially fully charged. This, in turn, will ensure that the user will have access to the full potential capacity of the power source when and if the user requires such reserve capacity.

Figure 1:
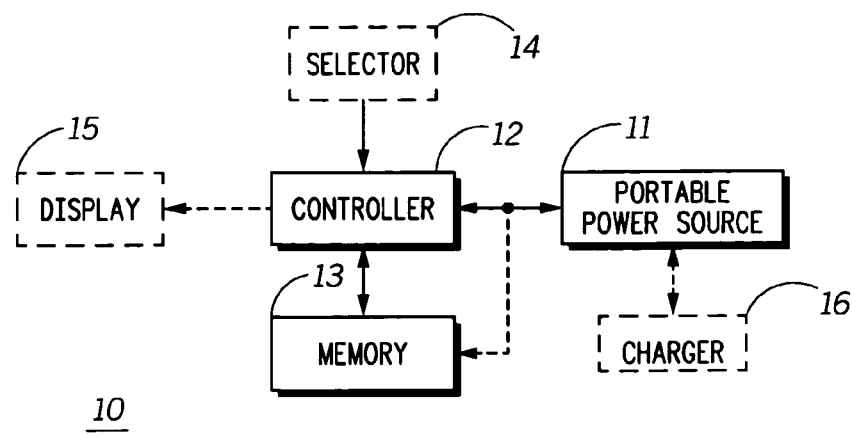
FIG. 1 comprises a block diagram depiction in accordance with various embodiments of the invention.

Referring now to the drawings, and in particular to FIG. 1, an illustrative device can comprise a portable power source 11 that serves to provide power to at least some other components (both as illustrated and otherwise) of the device 10. This portable power source 11 can comprise one or more batteries or cells and can be comprised of any appropriate material or employ any appropriate technology as may be presently known or hereafter developed. This includes but is not limited to nickel-cadmium batteries, sealed lead acid batteries, nickel-metal-hydride batteries, lithium ion batteries, and lithium polymer batteries, to name a few. In general, such a portable power source will preferably comprise a rechargeable platform to more likely attain the full benefit of these teachings.

Such a device 10 will also typically include a controller 12. The controller 12 will be operably coupled to the portable power source 11 in order to permit the latter to power (at least partially) the former. Depending upon the needs of the application, such a controller 12 may serve to effect one or more desired functions or capabilities to support or effect the purpose and intent of the device itself. For example, if the device were to comprise a cellular telephone handset, the controller 12 could also serve to control the communications signaling, power management, user interface, and so forth in accordance with well understood prior art technique.

In a preferred embodiment, such a controller 12 can also serve to facilitate certain actions that accord with these teachings. For example, the controller 12 can be readily configured through appropriate programming or the like to detecting recharging of the portable power source, to determine a present level of depletion of the portable power source upon detecting such recharging, and to facilitate using that determined level of depletion to provide a second charge depleted threshold value as referenced above. If desired, of course, such functionality can be rendered via a stand-alone component and/or can be distributed over a plurality of implementing platforms. Such architectural choices and options are well understood in the art and therefore further elaboration will not be provided here for the sake of brevity and the preservation of focus.

In a preferred embodiment the device 10 will also include a memory 13. This memory may comprise a discrete entity as suggested by the illustration or can comprise an integral part of another component such as, for example, the controller 12. In addition it will be well understood that such a memory 13 can be comprised of multiple individual discrete memory units (to thereby effect a distributed memory architecture) and/or can be embodied partially or fully in a remote fashion with respect to the device 10 itself Again, such architectural options are well understood in the art and it should be understood that such options are all generally compatible with these teachings.

In a preferred embodiment, the device 10 will include at least a first and a second charge depleted threshold value wherein the latter corresponds to a reduced amount of charge depletion (i.e., less depletion) as compared to the first charge depleted threshold value. Such charge depleted threshold values can be stored, for example, in the memory 13. As will be shown below in more detail, such charge depleted threshold values can be accessed and used by, for example, the controller 12 when implementing various embodiments that accord with this invention. Pursuant to one embodiment, the apparatus 10 can automatically select which charge depleted threshold value to use. In lieu of such an approach, or as a complement thereto, the apparatus 10 can also optionally include a selector 14. Such a selector can serve to permit a user to specifically select a particular one of a plurality of charge depleted threshold values to utilize. Such a selector 14 can assume any appropriate user interface guise including but not limited to physical switches and other assertable mechanisms, a touch screen, a voice responsive system, and so forth.

Such an apparatus 10 can also optionally include a display 15 (which again can be comprised of any known or hereafter developed display technology including but not limited to cathode ray tube displays, liquid crystal displays and other pixelated display platforms, plasma displays, projection displays, and so forth). Such a display 15 can depict, for example, indicia that correspond to whichever charge depleted threshold value (and/or corresponding discharge monitoring methodology) is presently in use by the apparatus 10 and/or that identifies the candidate charge depleted threshold values or methodologies that are available for use by the apparatus 10. As will be shown below, for example, the display 15 can provide a first user-perceivable visual indicator that corresponds to a level of charge depletion of the portable power source 11 as compares to the first charge depleted threshold value and a second user-perceivable visual indicator that corresponds to a level of charge depletion as compares to the second charge depleted threshold value.

So configured, such an apparatus 10 can serve in various ways to support the teachings set forth herein. During a learning mode of operation, for example, such an apparatus 10 can detect when the portable power source 11 is being recharged by a charger 16 and determine a corresponding present level of depletion for the portable power source 11 upon detecting such an event. That level of depletion information can then be used to provide or otherwise influence provision of a corresponding charge depleted threshold value. This permits dynamically determined and behavior-influenced threshold values to be rendered that are representative of how a given user tends to user the apparatus 10 with respect to recharging cycles behavior. During normal operation, such an apparatus 10 can use various charge depletion threshold values to provide an indication to a user of when recharging may be appropriate to match the user's historical (or otherwise selected) behavior patterns. This, in turn, can help to influence a greater overall lifetime for the portable power source 11 while also tending to ensure that the portable power source 11 will be fully charged at the completion of a charging cycle.

Figure 2:
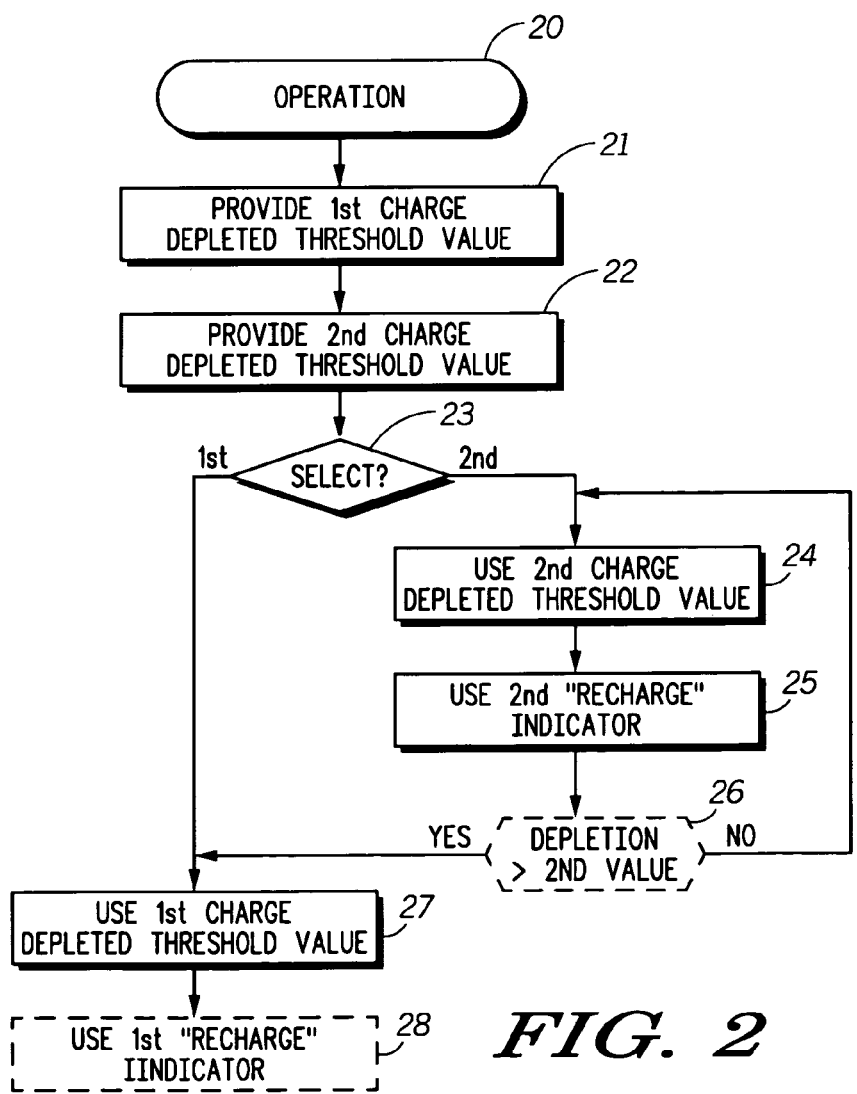
FIG. 2 comprises a flow diagram in accordance with various embodiments of the invention.

Referring now to FIG. 2, a process 20 that can make effective use of such a platform 10 (and other platforms as well) will be described. This process 20 provides both a first charge depleted threshold value 21 and a second charge depleted threshold value 22. Pursuant to a preferred approach, the second charge depleted threshold value represents a level of charge depletion for a corresponding portable power source that is less than a level of charge depletion as corresponds to the first charge depleted threshold value. For example, the first charge depleted threshold value may correspond to a substantially complete level of charge depletion (such as a 100% level of charge depletion) while the second charge depleted threshold value may correspond to an 80% level of charge depletion.

Figure 3:
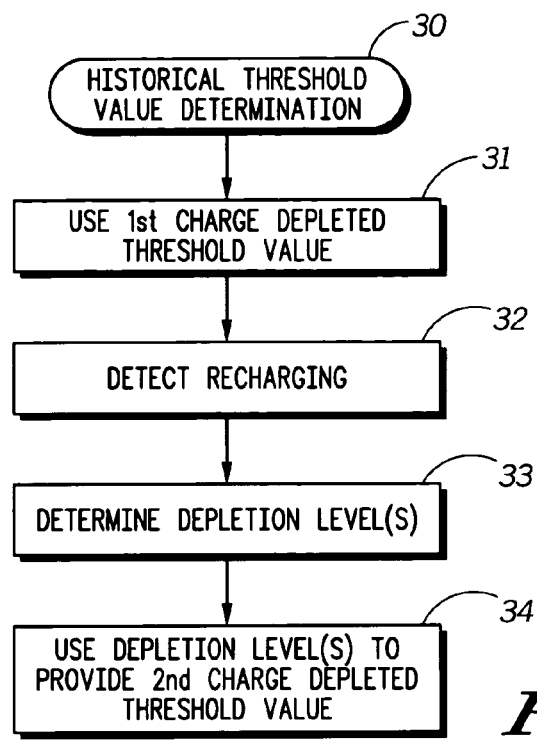
FIG. 3 comprises a detail flow diagram in accordance with various embodiments of the invention.

Pursuant to one embodiment both charge depleted threshold values can comprise static predetermined values. Pursuant to a preferred approach, however, at least the second charge depleted threshold value comprises a historically derived charge depleted threshold value. That is, the second charge depleted threshold value can be provided as a function, at least in part, of historical levels of charge depletion for the portable power source at issue. Referring momentarily to FIG. 3, a historical threshold value determination process 30 can comprise, for example, optionally first using the first charge depleted threshold value (or such other value or values as may be appropriate in a given application) during use of the apparatus to determine when to present information to a user of the device that the portable power source should now be recharged. This process 30 then detects 32 recharging events as initiated by the user and determines 33 a then corresponding level of depletion for the portable power source upon detecting such recharging. That level of depletion can then be used 34 to provide a second charge depleted threshold value.

For example, if the process 30 determines that the user recharged the portable power source when the charge on the latter had been depleted to 30%, then a 70% level of charge depletion could then be selected for use as the second charge depleted threshold value. Pursuant to a preferred embodiment the process 30 will iterate itself through numerous recharging events to thereby detect multiple instances of recharging and determination of corresponding levels of depletion for at least some of these multiple recharging events. The resultant multiple determined levels of depletion can then be used to provide a second charge depleted threshold value that possibly better correlates to the user's average behavior pattern. For example, five such cycles might be required before determining a second charge depleted threshold value. In such an embodiment, for example, the five values can be averaged (in a weighted or unweighted fashion as may be appropriate to the requirements of a given application) to determine the second charge depleted threshold value.

Referring again to FIG. 2, presuming availability of at least the first and second charge depleted threshold values, the process 20 then determines selection 23 of one such threshold value. This selection process may simply comprise detecting a user input (such as when the corresponding apparatus has a selector capability) and using that user input to select the appropriate corresponding threshold value. Pursuant to another approach, or in the absence of a specific selection by a user, this selection can also comprise an automatic selection of a particular one of the threshold values. The basis for making such an automatic determination can be as desired. For example, a particular threshold value can be selected as a function of one or more of the user's identity, a time of day or day of week, detection of a particular operational mode for the apparatus itself, and so forth.

As another example of an automatic selection, the process 20 can base the selection of use of a second charge depletion threshold value as a function, at least in part, that such a second charge depletion threshold value exists. That is, when the process 20 derives such a threshold value as a result of the user's historical behavior, that same historical behavior can be used to cause the process 20 to select the corresponding threshold value. Simply put, when the user tends to recharge their battery when the battery is only about, for example, 65% discharged, then the process 20 can provide a corresponding threshold value and can also select that corresponding threshold value for use in this process upon having provided that threshold value.

When the process 20 selects 23 the first charge depleted threshold value the process 20 then uses 24 that first charge depleted threshold value to assess, for example, when the user should be signaled that recharging comprises an imminent concern. As one optional but specific example, the first charge depleted threshold value can be used 25 to provide a corresponding first recharge indicator (and/or present charge indicia).

Figure 4:
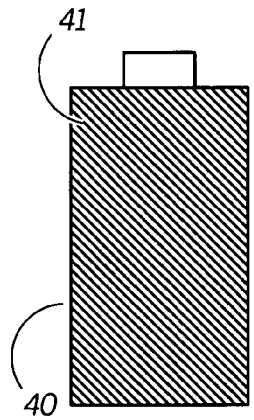
FIGS. 4 through 7 comprise views of an illustrative visual indicator that corresponds to whether a given portable power source should be recharged.
Figure 5:
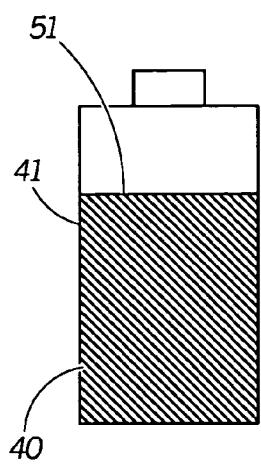

For example, and referring momentarily to FIG. 4, a first visual indicator comprising a battery-shaped icon 40 can be displayed wherein the battery shaped icon 40 has a particular fill color and/or pattern 41 that represents a current level of charge for the corresponding portable power source. For example, when the icon 40 is substantially filled with the color/pattern 41 as illustrated in FIG. 4, the visual indicator can indicate that the portable power source is essentially fully charged. As the charge depletes during usage, the first charge depleted threshold value can be used to compare against the present charge level to permit a corresponding display via the visual indicator. For example, as depicted in FIG. 5, the fill color/pattern 41 can be reduced to a level 51 that corresponds to a correlated level as a function of how the present charge level compares to the first charge depleted threshold value. In this illustration, this reduced level 51 equates to about a 70% charge. And, since the first charge depleted threshold value in this example represents a substantially complete level of charge depletion, the portable power source itself will have, in fact, about a 70% charge presently remaining. In other words, in this embodiment the first charge depleted threshold value serves to facilitate presentation of a remaining charge indicia that represents an actual remaining charge for the portable power source.

Figure 6:
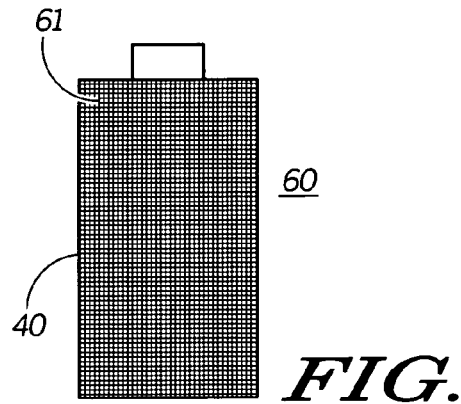

Referring again to FIG. 2, when the process selects 23 the second charge depleted threshold value (which, it will be recalled, in a preferred embodiment corresponds to a reduced amount of charge depletion as compared to the first charge depleted threshold value), the process 20 will then use 26 that second charge depleted threshold value to assess the present charge level for the portable power source. In particular, and in a preferred embodiment, the process 20 can optionally use 27 a second recharge indicator that corresponds to that second charge depleted threshold value. For example, and referring momentarily to FIG. 6, a second visual indicator 60 can be provided to indicate usage of the second charge depleted threshold value.

This second visual indicator 60 can have, if desired, some similarity to the first visual indicator. For example, as illustrated, the second visual indicator 60 can make use of the same battery-shaped icon 40 as partially comprised the first visual indicator. In a preferred embodiment, however, the second visual indicator will be different from the first visual indicator to allow a user to discern which charge depleted threshold value and/or charge assessment is presently being used. To effect such a difference when a similar or identical icon form factor 40 has been employed, the second charge depleted threshold value can make use of a color/fill pattern 61 that differs from the color/fill pattern 41 for the first visual indicator. So configured, a user can readily discern, for example, when the process uses a standard charge monitoring process and when the process uses a modified charge monitoring process.

Figure 7:
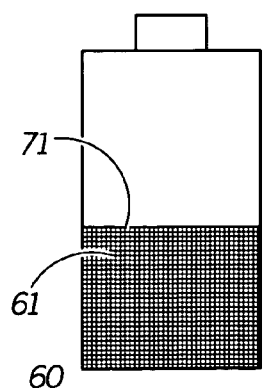

With reference to FIG. 7, as before, as the charge level for the portable power source drops during use, the visual indicator will track accordingly. For example, as illustrated, the color/fill pattern 61 can drop to a corresponding level 71. Upon comparing the illustrative examples depicted in FIG. 5 and FIG. 7, however, it can be seen that the second visual indicator portrays the portable power source as being more greatly depleted than does the first visual indicator notwithstanding the fact that, in this example, both representations correlate to an identical actual level of charge depletion. This occurs because the second charge depleted threshold value represents a reduced level of charge depletion than the first charge depleted threshold value and hence essentially measures the present level of discharge against a reduced range, such that, proportionally, the second visual indicator makes it appear as though the portable power source is more depleted than it actually is.

So configured, a user who tends to recharge their portable power source when their portable power source is normally only about, say, 60% depleted, will be provided with a visual indicator that provides an informational indicia to the user that represents that the portable power source requires recharging when this 60% level of depletion has been reached. For example, the color/fill pattern for the visual indicator can portray the level of charge as being essentially fully dissipated when the 60% level of discharge has been reached. The user can then respond by recharging the portable power supply to return the latter to a full charge.

This, in turn, can contribute to a charging pattern that is both consistent with the user's general pattern of usage and that further aids in contributing to the overall effective lifetime of the portable power supply itself.

Referring again to FIG. 2, from time to time the user may be unable (or unwilling) to recharge the portable power source in response to such an indication via the process 20. Pursuant to an optional but preferred embodiment, the process 20 can monitor to determine 28 whether and when the user depletes the charge level of the portable power supply beyond the level that corresponds to the second charge depleted threshold value. For example, the latter may correlate to a 73% level of discharge, but the user may continue using the apparatus and discharging the portable power source to a 75% level of discharge. When this occurs, the process 20 can automatically switch to use of a different charge depleted threshold value. For example, when only the first and second charge depleted threshold values are available, the process 20 can switch to use 24 of the first charge depleted threshold value as described above. This can include, of course, switching to the corresponding visual indicator for the first charge depleted threshold value as also is described above.

So configured, it will be appreciated that an apparatus can learn, over time, the recharging behaviors of a given user. That information can be used to develop a corresponding threshold value (or values) to provide recharging advice to that user that tends to conform to and actually encourage the normal behavior of the user. This in turn has the advantage of potentially extending the useful lifetime of the portable power source. In addition, this approach has the benefit of providing the user with a fully charged portable power source, such that if and when the user requires additional charge for whatever reason, it will be available. The differing visual indicators can be used to aid the user in identifying when a normal and when an alternative discharge monitoring process is in effect. That, in turn, can aid the user in assessing when reserve charge capacity may be available notwithstanding a contrary representation by the visual indicator.

In the illustrative examples provided above, only two charge depleted threshold values have been presented. This aided in ensuring clarity with respect to presentation of these embodiments. It will be readily understood by the reader, however, that other possibilities exist and are encompassed by these same teachings. For example, three or more charge depleted threshold values can be provided or determined to suit various requirements of a given apparatus, anticipated user, or operational paradigm. As but one of many available examples, the apparatus may have a predetermined first and second charge depleted threshold value and may accommodate an additional historically determined charge depleted threshold value. The second threshold value can be used by the process in lieu of the third threshold value when, for example, there is insufficient data to permit confident determination of a useful threshold value or when the historical data includes values that differ from a representative average value by more than a permitted degree of deviation.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use with a device having a portable power source, comprising:

providing a first charge depleted threshold value;

providing a second charge depleted threshold value that represents a level of charge depletion for the portable power source that is less than a level of charge depletion as corresponds to the first charge depleted threshold value;

selecting one of the first charge depleted threshold value and the second charge depleted threshold value to provide a selected charge depleted threshold value;

using the selected charge depleted threshold value to present information to a user of the device to indicate that the portable power source should be recharged, wherein a first indicator is used to present the information to the user when the selected charge depleted threshold value is the first charge depleted threshold value and a second indicator is used to present the information to the user when the selected charge depleted threshold value is the second charge depleted threshold value.

2. The method of claim 1 wherein providing a second charge depleted threshold value further comprises providing a second charge depleted threshold value as a function, at least in part, of historical levels of depletion for the device.

3. The method of claim 2 wherein providing a second charge depleted threshold value as a function, at least in part, of historical levels of depletion for the device further comprises:

selecting the first charge depleted threshold value to present information to a user of the device to indicate that the portable power source should be recharged;

detecting recharging of the portable power source;

determining a level of depletion for the portable power source;

using the level of depletion to provide the second charge depleted threshold value.

4. The method of claim 3 wherein:

detecting recharging of the portable power source further comprises detecting multiple instances of recharging of the portable power source; and determining a level of depletion for the portable power source further comprises determining a level of depletion for the portable power source for each of at least a plurality of the multiple instances.

5. The method of claim 1 wherein selecting one of the first charge depleted threshold value and the second charge depleted threshold value to provide a selected charge depleted threshold value further comprises automatically selecting one of the first charge depleted threshold value and the second charge depleted threshold value to provide a selected charge depleted threshold value.

6. The method of claim 1 wherein selecting one of the first charge depleted threshold value and the second charge depleted threshold value to provide a selected charge depleted threshold value further comprises:

detecting a user input;

using the user input to select one of the first charge depleted threshold value and the second charge depleted threshold value to provide a selected charge depleted threshold value.

7. The method of claim 1 wherein using a first indicator further comprises using a first visual indicator and using a second indicator further comprises using a second visual indicator.

8. The method of claim 7 wherein using a first visual indicator further comprises using a displayed icon having a first visual attribute and using a second visual indicator further comprises using the displayed icon having a second visual attribute that is different from the first visual attribute.

9. The method of claim 1 and further comprising, when using the second charge depleted threshold value as the selected charge depleted threshold value:
- detecting when the portable power supply has been depleted by at least a predetermined amount beyond a level of depletion that corresponds to the second charge depleted threshold value;
- automatically switching to the first charge depleted threshold value for use when determining when to present information to a user of the device to indicate that the portable power source should be recharged.

10. An apparatus comprising:
- a portable power source;
- a power capacity detector operably coupled to the portable power source;
- a first charge depleted threshold value;
- a second charge depleted threshold value that corresponds to a reduced amount of charge depletion as compared to the first charge depleted threshold value;
- a first user-perceivable indicator that corresponds to a level of charge depletion of the portable power source as compares to the first charge depleted threshold value; and
- a second user-perceivable indicator that corresponds to a level of charge depletion of the portable power source as compares to the second charge depleted threshold value.

11. The apparatus of claim 10 wherein the power capacity detector comprises a voltage level detector.

12. The apparatus of claim 10 wherein the first charge depleted threshold value comprises at least a substantially complete level of charge depletion.

13. The apparatus of claim 10 wherein the second charge depleted threshold value comprises an historically derived charge depleted threshold value.

14. The apparatus of claim 13 and further comprising means for:
- detecting recharging of the portable power source;
- determining a level of depletion for the portable power source upon recharging the portable power source;
- using the level of depletion to provide the second charge depleted threshold value.

15. The apparatus of claim 14 wherein the means are further for determining a plurality of levels of depletion for the portable power source as each corresponds to a plurality of recharging events and using the plurality of levels of depletion to provide the second charge depleted threshold value.

16. The apparatus of claim 10 wherein the first user-perceivable indicator comprises a first visual indicator and the second user-perceivable indicator comprises a second visual indicator.

17. The apparatus of claim 16 wherein the first visual indicator comprises an icon having a first visually perceivable attribute and the second visual indicator comprises the icon having a second visually perceivable attribute, which second visually perceivable attribute is different from the first visually perceivable attribute.

18. The apparatus of claim 10 and further comprising selection means for selecting one of the first and second charge depleted threshold values to use when determining when to provide an indication to a user of the apparatus that the portable power source should now be recharged.

19. The apparatus of claim 18 wherein the selection means automatically selects the first charge depleted threshold value when the second charge depleted threshold value is presently in use and the portable power source has become depleted to at least a predetermined amount with respect to a level of charge depletion that corresponds to the second charge depleted threshold value.

20. The apparatus of claim 19 wherein the predetermined amount comprises an amount that is at least more than the level of charge depletion that corresponds to the second charge depleted threshold value.

* * * * *